US008239380B2

(12) United States Patent
Brill

(10) Patent No.: US 8,239,380 B2
(45) Date of Patent: Aug. 7, 2012

(54) SYSTEMS AND METHODS TO TUNE A GENERAL-PURPOSE SEARCH ENGINE FOR A SEARCH ENTRY POINT

(75) Inventor: Eric D. Brill, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1771 days.

(21) Appl. No.: 10/600,797

(22) Filed: Jun. 20, 2003

(65) Prior Publication Data

US 2004/0260695 A1 Dec. 23, 2004

(51) Int. Cl.
*G06F 7/00* (2006.01)
*G06F 17/30* (2006.01)

(52) U.S. Cl. ........................................ 707/728
(58) Field of Classification Search .......... 707/3, 5, 707/4, 1, 2, 10; 705/7
See application file for complete search history.

(56) References Cited

U.S. PATENT DOCUMENTS

| | | | |
|---|---|---|---|
| 5,826,260 A | 10/1998 | Byrd, Jr. et al. | |
| 6,078,917 A | 6/2000 | Paulsen, Jr. et al. | |
| 6,360,215 B1 * | 3/2002 | Judd et al. | 707/3 |
| 6,418,433 B1 | 7/2002 | Chakrabarti et al. | |
| 6,546,388 B1 | 4/2003 | Edlund et al. | |
| 6,601,075 B1 | 7/2003 | Huang et al. | |
| 6,633,885 B1 | 10/2003 | Agrawal et al. | |
| 6,985,948 B2 * | 1/2006 | Taguchi et al. | 709/225 |
| 7,043,521 B2 * | 5/2006 | Eitel | 709/202 |

OTHER PUBLICATIONS

Kaindl et al., "Combining Structure Search and Content Search for the World-Wide Web", Proceedings of the Ninth ACM Conference on Hypertext and Hypermedia, pp. 217-224; Pittsburgh, Pa, 1998.*
Meng et al., "Improve Web Search Accuracy Using Personalized Profile", University of Texas—Pan America, Department of Computer Science; Jan. 1999.*
Hansen et al., "Using navigation data to improve IR functions in the context of Web search", Proceedings of the tenth international conference on Information and knowledge management; Atlanta, Georgia, USA; pp. 135-142; ACM Press, 2001.*
Chang et al. ("A Multi-Engine Search Tool with Clustering", 6th International World Wide Web Conference, Apr. 1997.*
Lawrence, "Context in Web Search", IEEE Data Engineering Bulletin: vol. 23, No. 3, pp. 25-32, 2000.*
Pazzani et al., "Learning and Revising User Profiles: The Identification of Interesting Web Sites", Machine Learning 27, pp. 313-331, 1997, Kluwer Academic Publishers.*
Joachims, "Optimizing Search Engines Using Clickthrough Data", Proceedings of the Eighth ACM SIGKDD International Conference on Knowledge Discovery and Data Mining, pp. 133-142, 2002, ACM.*

(Continued)

*Primary Examiner* — Michael Hicks
(74) *Attorney, Agent, or Firm* — Lee & Hayes, PLLC

(57) ABSTRACT

The present invention provides systems and methods that employ statistical filtering and ranking techniques to improve content search engine search results by tuning a general-purpose search engine for an entry point for a group of users. The filter can be manually and/or automatically configured via providing training sets of relevant and non-relevant data. For example, a relevant set of data comprising web pages associated with a desired search context for the group utilizing the entry point can be employed. In addition, a non-relevant set of data comprising random and unrelated documents can be employed. The learned filter can then be employed to compare a returned result with the known relevant and the known non-relevant data sets to determine whether the result is relevant to the user for the entry point, and the degree of relevance. The results can then be presented to the user based on the relevance.

42 Claims, 10 Drawing Sheets

OTHER PUBLICATIONS

Keiichiro Hoashi, et al., Document Filtering Method Using Non-Relevant Information Profile, Proceedings of the 23rd Annual ACM SIGIR Conference, 2000, pp. 176-183.

Gondy Leory, et al., The Use of Dynamic Contexts to Improve Casual Internet Searching, ACM Transactions on Information Systems, 2003, vol. 21, Issue 3, pp. 229-253.

* cited by examiner

SYSTEMS AND METHODS TO TUNE A GENERAL-PURPOSE SEARCH ENGINE FOR A SEARCH ENTRY POINT

TECHNICAL FIELD

The present invention generally relates to a search engine query, and more particularly to systems and methods that improve content search engine results via tuning a general-purpose search engine for a search entry point.

BACKGROUND OF THE INVENTION

Periodic incremental improvements in microprocessor based technology such as higher data, address and control transfer rates, larger volume storage devices, minimal power consumption, and reduced package sizes have facilitated the evolution to the electronic, or e-age. For example, recent technological improvements have led to the design and development of low cost, multi-purpose communication devices such as cellular phones that can interface with a computer network, record an image, and playback music, as well as perform conventional telephonic functions. Such a device can provide a user with one device that typically is more compact and less expensive than the devices that it succeeded.

As microprocessor based devices become more robust, economical, and efficient, more consumers are purchasing and employing such devices to replace conventional means of completing daily tasks. For example, conventionally, storage of information such as tax returns, photographs and personal information (e.g., birth certificates and banking transactions) employed non-electronic medium such as paper and/or variants thereof. In contrast, today a photograph can be digitally recorded and/or derived from an analog photograph (e.g., via a scanner) to render a virtually permanent, non-degrading image. In another example, conventional learning techniques included attending an instructive session(s), which can be time bounded and expensive, and purchasing paper books, which can be costly. Today, self-sufficient "how to" electronic documents and applications, and e-books are readily available and cost-effective.

The transformation to the e-age has additionally shifted the manner in which consumers obtain and share information. For example, consumers are continually shifting paradigms from conventional techniques employing paper options (e.g., catalogs and letters) and distant resources (e.g., libraries and telephone correspondence) to the essentially boundaryless and globally accessible information available via the Internet. Typically, such information is accessed via a search-engine through a web browser and/or a web page. For example, a user can deploy a general-purpose search engine and/or a specialized search engine by entering in a keyword(s) or phrase, and executing the search via a mouse click.

The general-purpose search engine can be an invaluable source to facilitate retrieving information over the Internet. Typically, the general-purpose search engine search attempts to provide an overall "best" link(s) to a web page(s) for a search query. In order to achieve the overall "best" search, the general-purpose search engine search exploits the resources available through the Internet to provide the user with general information regarding the search query. In contrast, the specialized search engine typically is limited to a particular knowledge base and is designed for a particular intended subaudience.

A disadvantage of the general-purpose search engine is that the results typically do not provide the "best" results for a respective query executed by a respective user. For example, if the user queries for the keyword "cell," the search engine cannot distinguish whether the user desires results associated with a cell phone, a battery cell, a cell of the human body or a cell in a spreadsheet. Instead, results for cell phone, the battery cell, the cell of the human body, the cell in a spreadsheet, and/or other topics including the term "cell" can be returned, which can provide the user with information unrelated to the desired search. A disadvantage with employing the specialized search engine is that the searchable content generally is selected a priori, and thus the user does not benefit from content outside of the searchable content. In addition, the specialized search engine typically is a rigid approach and cannot easily be adjusted to different user's needs.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides systems and methods that filter and/or rank the search results from a general-purpose search engine search in order to exploit the large volume of searchable data available to the general-purpose search engine and mitigate providing the user with unrelated results. Conventionally, the general-purpose search engine searches the information available via the Internet, and provides general results to the user, which can include results unrelated to the context of the search query. The present invention provides a novel approach to tune the general-purpose search engine to an entry point for a group of users to exclude and/or rank lower information non-relevant to the users' search context.

In general, the filter can be employed in connection with a search executed by a user from a web client (e.g., a computer with access to the Internet). The filter can be configured for the user group associated with the web client by providing a data set associated with a desired search context (e.g., relevant data) and a data set unrelated to the desired search context (e.g., non-relevant data) to the filter. After executing the search query, the filter can be employed to compare a returned result with the known relevant and the known non-relevant data sets to determine whether the result is relevant to the user. In addition, when more that one result is returned or deemed relevant to the user, the results can be sorted (e.g., ranked) to variously display the results to the user based on the relevance, or the similarity between the results and the relevant data.

In one aspect of the present invention, a tuning component can be trained to differentiate between relevant and non-relevant data for respective entry points. The training can include providing the tuning component with sets of relevant data and sets of random, non-relevant data in order for the tuning component to learn the properties associated with relevant data. The tuning component can then be interfaced with a general-purpose search engine. When a user employs a search engine to execute a query, the results can be conveyed to the tuning component, wherein the learned component can separate relevant returned data from non-relevant returned data for the respective entry points, and provide the user with sorted data, based on relevance.

In another aspect of the present invention, a filter component can be automatically trained to differentiate between relevant and non-relevant data for respective entry points. For example, a mechanism (e.g., a storage medium such as a log) can be employed to mirror a user's actions after results are retuned. For example, the sites associated with the links selected by the user can be stored, and then employed as relevant data to train the filter. In addition, a non-selected higher ranked site and/or a site not selected can be stored and employed as non-relevant data. Then, the sets of relevant data and sets of non-relevant data can be automatically conveyed to the filter component to provide information that can be utilized to train the filter component. Subsequently, when a user executes a query via the search engine, the filter component can mitigate returning non-relevant data. In yet another aspect of the invention, a manual technique can be employed, wherein a user constructs relevant and non-relevant data sets, and manually provides the data sets to the filter component during training.

In still another aspect of the present invention, probability distributions can be generated for relevant data sets, non-relevant data sets, and for a returned result, wherein the probability distribution associated with the returned result can be compared with the relevant and non-relevant data probability distributions to determine whether the returned result is more likely to be relevant or non-relevant data. A ranking mechanism can be employed in connection with returning the results to the user in order to rank results via the degree relevance. Various techniques can be employed in accordance with an aspect of the present invention, for example statistical hypothesis testing, confidence intervals, and distributional similarities.

In other aspects of the present invention, methodologies are provided to manually and automatically tune a system to filter non-relevant data returned from an entry point(s), and then rank the filtered data.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
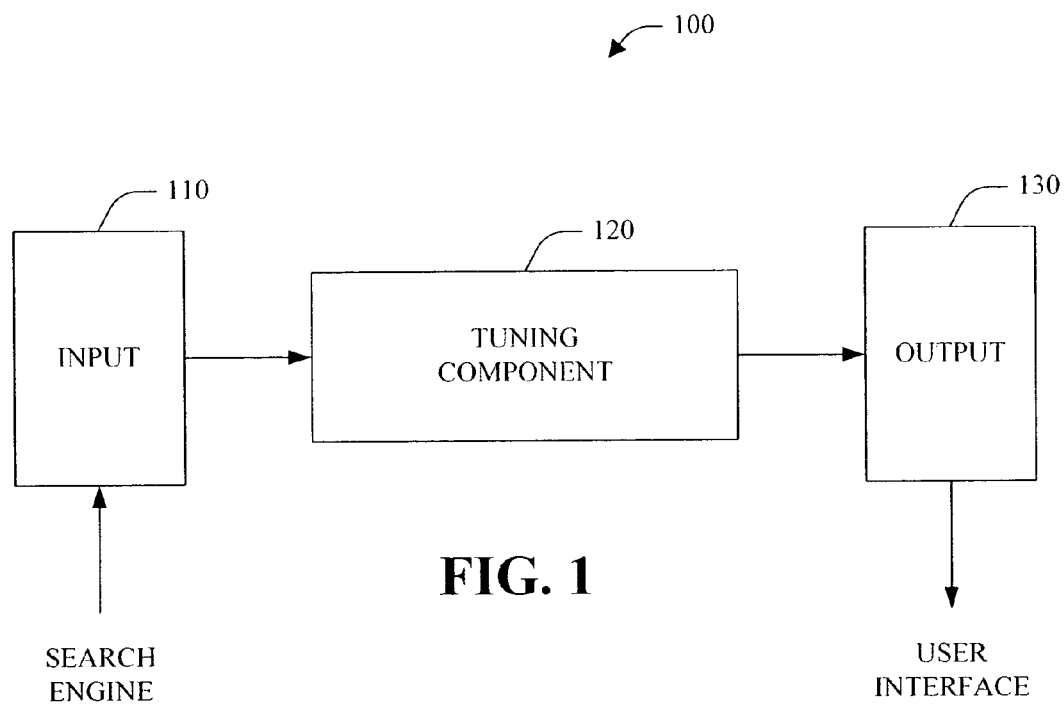
FIG. 1 illustrates a system that tunes a general-purpose search engine, in accordance with an aspect of the present invention.

The present invention relates to systems and methods that tune a general-purpose search engine in order to provide a user with ranked results related to the user's search context. The systems and methods employ a means to filter general-purpose search engine results to separate relevant data (e.g., data related to the search context) from non-relevant data (e.g., data unrelated to the search context) in order to mitigate presenting the user with the unrelated results or to rank unrelated results lower than relevant results. The filter can be manually and/or automatically be configured via providing training sets of relevant and non-relevant data associated with an entry point to the filter. Additionally, the systems and methods can employ a means to prioritize and rank the filtered results for presentation to the user. Various filtering and/or ranking techniques (e.g., statistically based) can be utilized in accordance with an aspect of the present invention, as described in detail below.

It is to be appreciated that as utilized herein, the term "component" is intended to refer to a computer-related entity, either hardware, a combination of hardware and software, software, or software in execution. For example, a component can be, but is not limited to being, a process running on a processor, a processor, an object, an executable, a thread of execution, a program, and/or a computer. As an example, both an application running on a server and the server can be a computer component. One or more components can reside within a process and/or thread of execution and a component can be localized on one computer and/or distributed between two or more computers.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

FIG. 1 illustrates a system 100 that refines a general-purpose search engine to improve search engine content search results, in accordance with an aspect of the present invention. The system 100 comprises an input component 110 that receives query results, a tuning component 120 that refines the query results for a group of user, an entry point, and/or a search context, and an output component 130 that provides the refined results for display to a user(s) of the group.

The input component 110 can interface with the general-purpose search engine (not shown) to receive query results (e.g., one or more links to a document(s) and/or file(s)) after the user executes a search query via the entry point, or gateway to the general-purpose search engine. Examples of suitable entry points include various web sites, such as: a web site associated with the general-purpose search engine; a user; a corporation; a software application, such as a word processing program; a web page for a specific hobby, sport, age group, etc., a university; a library; and/or a newspaper. After accepting the results, the input component 110 can convey the results to the tuning component 120 for refinement.

The tuning component 120 can filter the received results, based on a document property(s), a context parameter(s), and/or a configuration associated with the entry point through which the search engine was accessed. For example, document properties such as a term that appears on a web page, a property of the a URL (Uniform Resource Locator) identifying the web page, a property of URLs and web pages that link to the web page and layout, can be employed to determine what properties of a document, or web page are indicative of the document being relevant to the user executing the search query from the entry point. In another example, the tuning component 120 can be configured for the entry point to differentiate between a result that is relevant and a result that is non-relevant to the search query context for a group of users. The configuration for the entry point can be based on statistics and can comprise one or more context parameters (e.g., word probabilities and probability distributions).

In one aspect of the present invention, the tuning component 120 can employ the filter via generating one or more context parameters for a received query result, and then applying the filter context parameter(s) to the generated context parameter(s). If a query result is determined to be relevant to the search query context, then the query result can be provided to the user(s). If a query result is determined not to be relevant, then the query result can be withheld from presentation to the user or provided after higher ranked results, as described below. It is to be appreciated that one or more query results can be deemed relevant, and/or one or more query results can be deemed non-relevant. In addition, it can be appreciated that all of the results received can be deemed relevant, and therefore all of the result can be provided to the user, or none of the results can be deemed relevant and none of the results provided to the user.

Optionally, the tuning component 120 can rank the results, based on document property(s), context parameter(s), and/or configuration. For example, the tuning component 120 can be employed to determine the degree of relevance of the results, and subsequently rank the results from most relevant to non-relevant, based on a similarity measure and/or a confidence interval. For example, a technique can be employed to the filtered results in order to display the results to the user in an ascending or descending order, based on the relevance.

The output component 130 can couple to a user interface such as a web browser (not shown) and provide the filtered and ranked results to the user interface. For example, the output component can interface with the web site, wherein the user executed the search query, and provide the filtered results based on the ranking of the tuning component 120. The ranked results can be selected by the user to access corresponding documents (e.g., web pages) and/or files.

The foregoing provides a mechanism to improve general-purpose search engine content search results. As noted above, a conventional general-purpose search engine can return results unrelated to the search context, and customized search engines typically are confined to content selected a priori, such that the user group cannot benefit from content outside of the selected collection. Thus, unlike conventional general-purpose and/or customized search engines, the present invention provides the benefit of searching the large volume of available information accessible through the Internet, while filtering and ranking the results to provide the user with the most relevant results prior to less relevant and non-relevant results.

It is to be appreciated that more than one entry point can be employed to deploy the general-purpose search engine. In addition, when two or more entry points are employed and associated with similar user group search behavior, the entry points can be clustered together.

Figure 2:
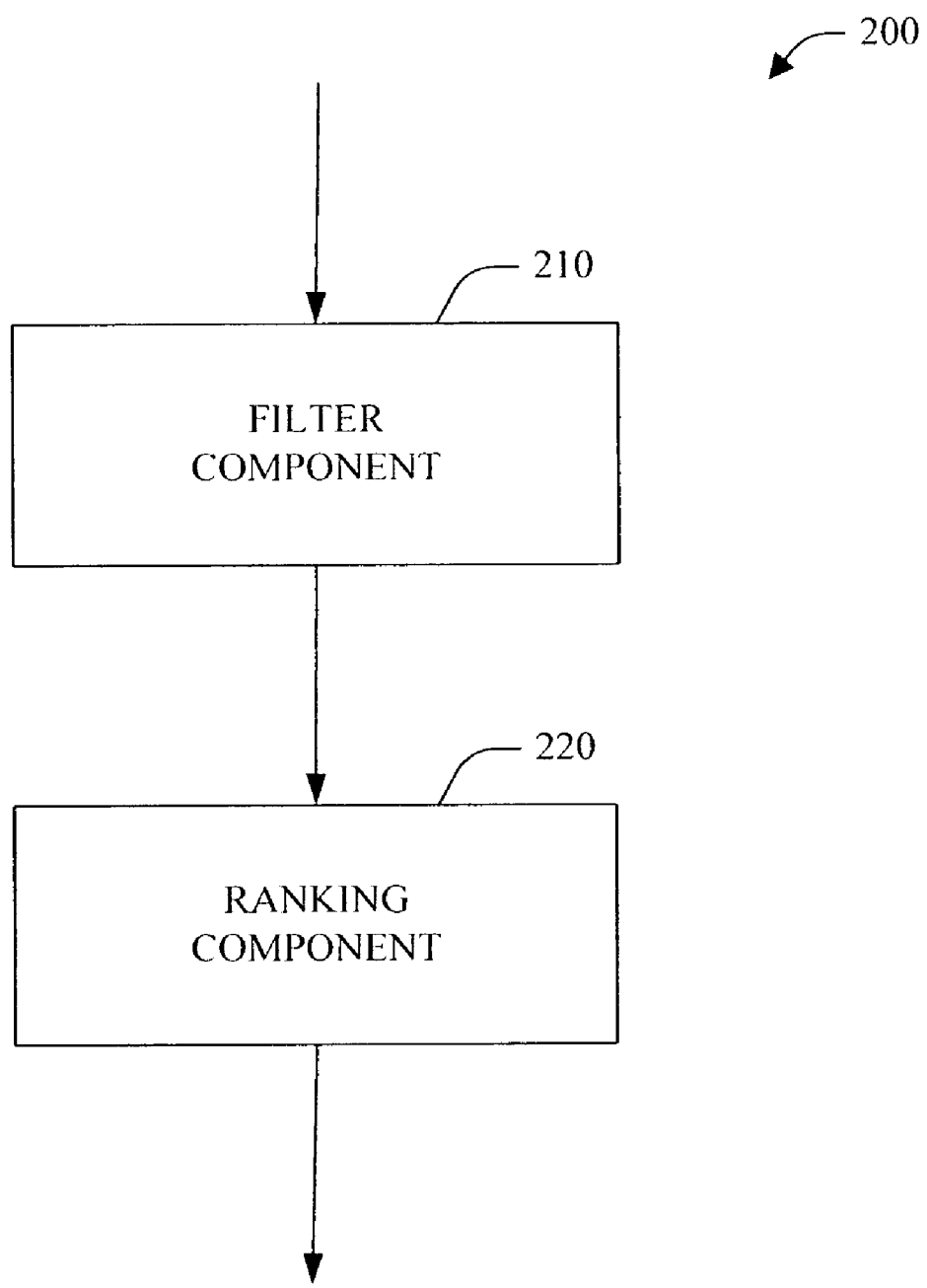
FIG. 2 illustrates a system that filters and ranks general-purpose search engine content results, in accordance with an aspect of the present invention.

FIG. 2 illustrates a system 200 that filters and ranks general-purpose search engine content results, in accordance with an aspect of the present invention. The system 200 comprises a filtering component 210 and a ranking component 220, and can be employed in connection with a computer interface to a repository of data, documents (e.g., web sites) and/or files, for example.

In general, a user logged on to the computer (and network) can deploy a web browser, and access a web site associated with the general-purpose search engine via an entry point. For example, the user can enter an address (e.g., a URL) for the general-purpose search engine's web site into a web browser's address bar and/or execute a link from within an application (e.g., a hyperlink or other link from within a word processor, a web browser and an email program) to the general-purpose search engine's web site. For example, the user can select the link to the "help pages" associated with the application from within the application.

After accessing the general-purpose search engine's web site (e.g., an associated home page), the user can provide a query, or search string (e.g., a keyword(s) and phrase) to the general-purpose search engine, and then execute the search query over the searchable data. The results commonly are provided to the general-purpose search engine, and then conveyed to the filtering component 210. However, it can be appreciated that the results can be provided to the filtering component 210 without traversing the general-purpose search engine. In addition, information indicative of the entry point can be provided to the filtering component 210 to identify the entry point such that appropriate configuration, context parameters, and properties for the entry point can be employed.

The filtering component 210 can then parse the results. For example, the filter component 210 can be configured to separate non-relevant results (e.g., results not associated with a search context of a group) from relevant results (e.g., results associated with the search context) for the entry point employed. The results and/or the relevant results can be provided to the ranking component 220. Optionally, the non-relevant results can be held back. Furthermore, various discriminating techniques can be employed to facilitate separating the results. For example, the filter component 210 can employ statistics, probabilities, similarities, likelihoods, associations, and correlations to facilitate separating the results.

Prior to providing the results (e.g., links to documents and/or files) to the user, the ranking component 220 can rank the results to present the results in a suitable manner to the user, as described in detail below. For example, the ranking component 220 can sort the filtered results based on degrees of similarity, confidence, and correlation. Subsequently, the filtered and ranked results can be provided to the user.

Figure 3:
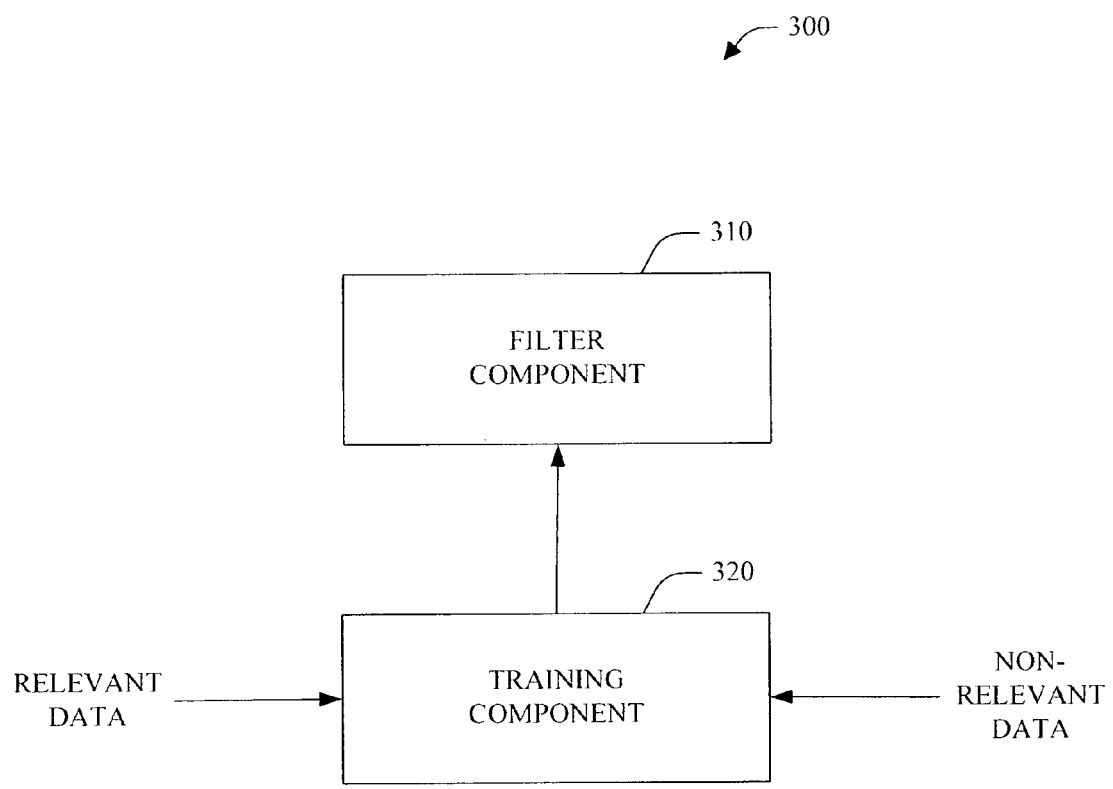
FIG. 3 illustrates a system to manually customize a general-purpose search engine filter, in accordance with an aspect of the present invention

FIG. 3 illustrates a configuration system 300 to manually customize a general-purpose search engine filter, in accordance with an aspect of the present invention. The configuration system 300 comprises a training component 310 that can obtain training data and a filter component 320 that can be trained with the data to the filter query results for an entry point. In general, a group user and/or a group administrator can employ the configuration system 300 to train the filter component 320 for one or more entry points for the group.

The training component 310 can accept a set of relevant data (e.g., data associated with a search context for the entry point) and/or a set of non-relevant data (e.g., random data not associated with the search context for the entry point). For example, a group user can assemble a set of data relevant to the context employed with the entry point and manually provide (e.g., serially and/or concurrently) the set of data (and optionally information to associate the data with the entry point) to the training component 310. Likewise, the set of non-relevant data can be provided to the training component 310. The input component 310 can then convey the training sets to the filter 320.

The filter 320 can employ the training sets to learn the features that differentiate relevant data from non-relevant data. For example, the relevant training set can comprise information associated with an application's domain, and the non-relevant training set can include a collection of random documents from the web that are unrelated to the application's domain. The relevant and non-relevant training data can be employed when a query result from the general-purpose search engine is returned. For example, the query result can be compared to the model sets to determine whether the result is more likely to be associated with relevant data or with non-relevant data, wherein if the result is deemed relevant, then it can be provided to the user. Otherwise, the result can be suppressed or provided after the relevant results. Various techniques can be employed to compare the result with the relevant and non-relevant data sets, as described below.

Figure 4:
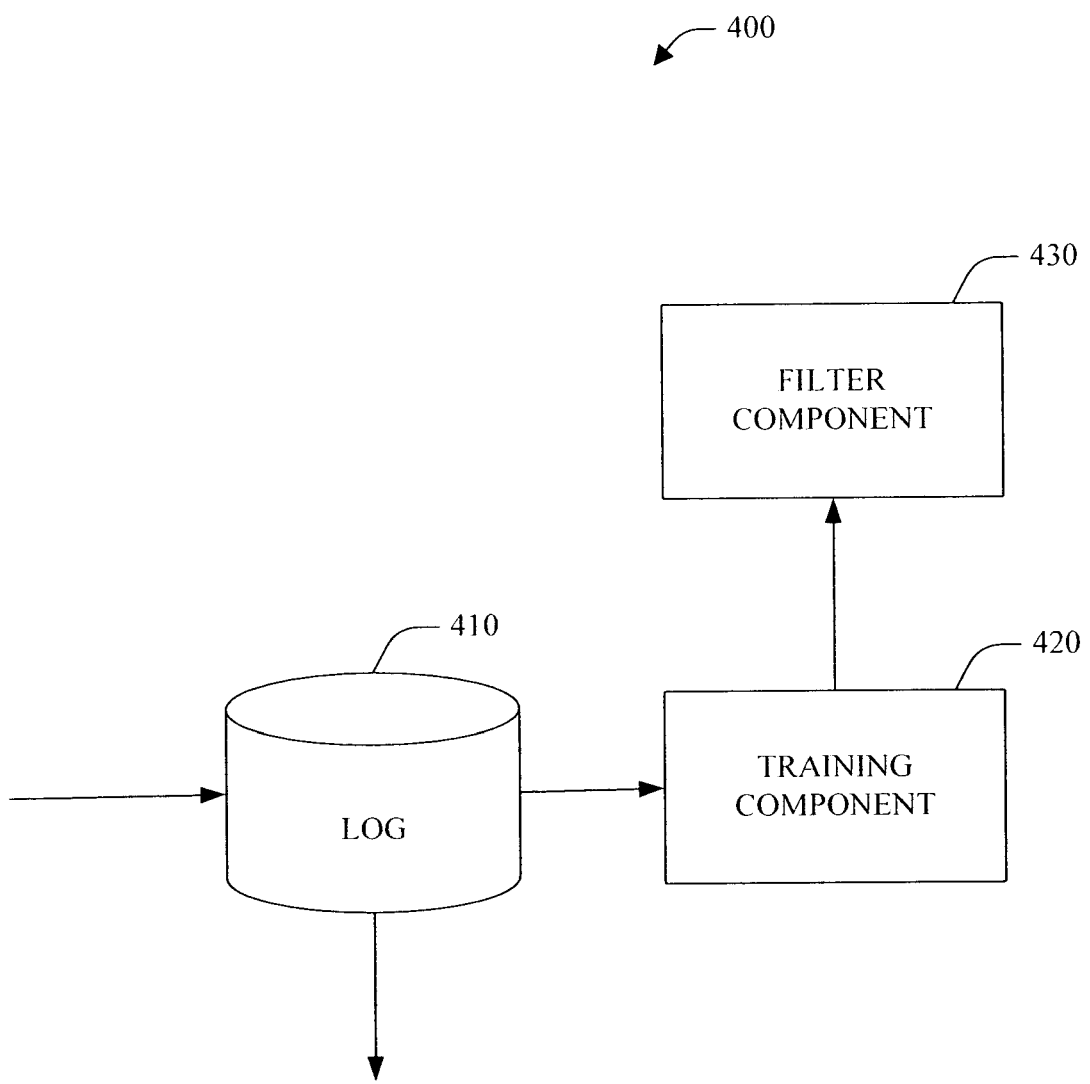
FIG. 4 illustrates a system to automatically configure a general-purpose search engine filter, in accordance with an aspect of the present invention

FIG. 4 illustrates a configuration system 400 to automatically customize a general-purpose search engine filter, in accordance with an aspect of the present invention. The configuration system 400 comprises a log 410 to selectively store query results, a training component 420 to facilitate filter configuration, and a filter component 430 that can be configured with the query results. Similar to the system 300, the system 400 can be employed to train the filter for one or more entry points.

In one aspect of the present invention, a user can execute a query search via a general-purpose search engine, through an entry point, as described above. The results of the search query can be provided to the user, for example, as a list based on properties associated with the general-purpose search engine. Then, as the user selects a result from the list by clicking (e.g., via a mouse) an associated link, the result can be saved to the log 410 and identified as relevant to the search context. When a lower-ranked result is selected while selecting a higher-ranked result is note selected the higher-ranked result(s) can be saved to the log 410 and identified as non-relevant to the search context. A non-selected result, wherein a lower-ranked result is not selected can be deemed and saved as non-relevant or not saved to the log 410.

The saved results can then be employed to train the filter component 420 for the entry point, as described above. For example, the saved results identified as relevant can be transmitted to the training component 420 and subsequently employed by the filter component 430 as a set of relevant data associated with a search context for the entry point to discern relevant results. The saved results identified as non-relevant can be conveyed to the filter component 430 via the training component 420, and employed as a set of non-relevant data to train the filter to discern non-relevant data from a subsequent search query.

In one aspect of the present invention, the saved results can be automatically provided (e.g., serially and/or concurrently) to the filter component 420 during training. In another aspect of the present invention, the saved results can be manually provided to the filter component 420, as described supra. The filter component 420 can employ the training sets to learn the features that differentiate relevant data from non-relevant data in manner similar to that of the training component 320.

Figure 5:
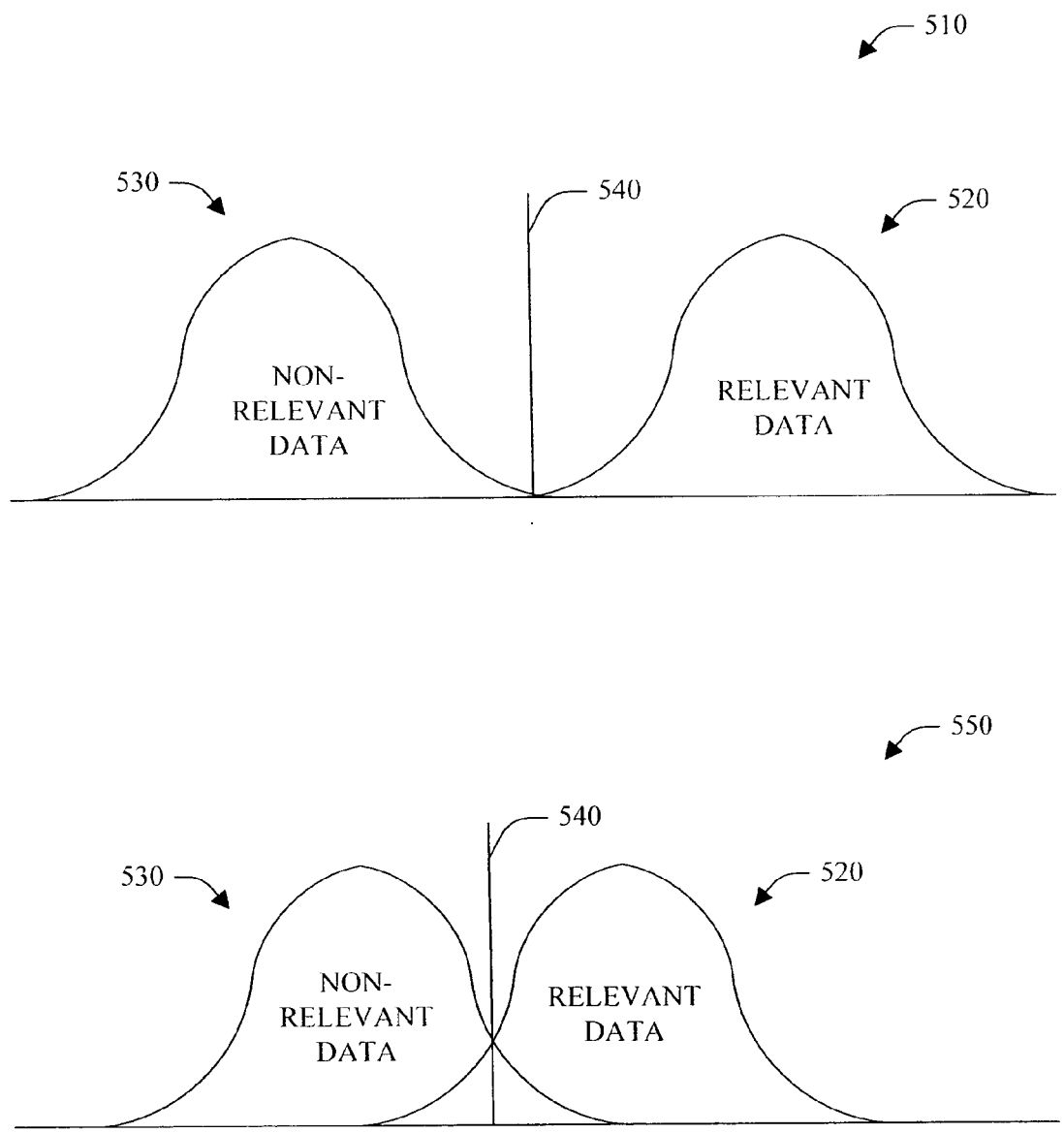
FIG. 5 illustrates an exemplary statistical based filtering technique, in accordance with an aspect of the present invention.

FIG. 5 illustrates an exemplary statistical-based filtering technique, in accordance with an aspect of the present invention. As noted supra, the present invention provides a filter (e.g., the filter components 210, 310 and 420) that can facilitate tuning search query results for an entry point. The filter can be manually and/or automatically configured for the entry point. For example, after selecting an entry point, a manual technique can be employed wherein a set(s) of documents relevant to a search query context can be manually provided to the filter. In addition, a set(s) of documents non-relevant to a search query context (e.g., random, unrelated web sites) can be manually provided to the filter. The filter can employ the relevant and non-relevant sets to learn to discriminate between a relevant and non-relevant query result.

Similarly, the automatic technique (e.g., click thru) can provide the filter with a set of documents relevant to a search query and a set of documents non-relevant to the search query. In general, after a user executes a search query via a general-purpose search engine through an entry point, the results of the search query are presented to the user. As the user selects links to documents for viewing, the selected links are automatically stored. In addition, where lower-ranked links are selected and higher ranked links are bypassed, the higher ranked links are automatically stored. After the user concludes selecting links, the stored selected links can be employed as a set relevant to the search query and the stored non-selected, higher-ranked links can be employed as a set non-relevant to the search query. The sets of relevant and non-relevant data can be automatically and/or manually conveyed to the filter to train (e.g., configure) the filter to learn to discriminate between a relevant and non-relevant query results.

When a query result is received, the filter can be employed to determine whether a query result is relevant or non-relevant and return the result accordingly. For example, a word probability distribution for the results, or documents and/or sets of documents can be generated, wherein a respective word probability can provide the probability that the respective word appears in a document from the set of documents.

In one aspect of the present invention, a statistical hypothesis can be employed to determine whether a result is relevant or non-relevant. An exemplary test statistic 510 can be employed, wherein the distributions for the sets of data can be represented as Gaussian, or normal distributions, for example, when the sets of documents include a large number of documents, as define by the central limit theorem. For instance, a first Gaussian distribution 520 can be generated for the set of relevant documents, and a second Gaussian distribution 530 can be generated for the set of non-relevant documents. Optionally, a threshold 540 can be set to facilitate determining whether a word probability is associated with the relevant data distribution 520 or the non-relevant distribution 530.

When query result is received, a word probability for the result can be generated and compared with the distributions to determine whether the result is likely to be relevant, or associated with the relevant distribution 520, as determined by the word probability location with respect to the relevant distribution 520 and the threshold 540, if utilized. For example, where the word probability lies between the threshold 540 and the relevant distribution 520, the result can be deemed relevant. Otherwise, the result can be deemed non-relevant.

In another example, an exemplary test statistic 550 can be employed, wherein the distributions 520 and 530 can overlap. Likewise, the threshold 540 can then be defined, and, when a result is received, a word probability can be generated and applied against the threshold 540 to determine whether the result is likely to be relevant. In one aspect of the invention, the threshold 540 can be defined as the midpoint between the distributions, wherein a word probability equal to or greater than the threshold 540 can indicate that the result is likely to be a relevant result. In contrast, a word probability less than the threshold 540 can indicate that the result is likely to be a non-relevant result. In another aspect of the present invention, the threshold 540 can be biased to favor the relevant or non-relevant distribution. For example, the threshold 540 can be biased to mitigate determining a result (e.g., word probability) is non-relevant when the result is relevant (e.g., a type I error). In another example, the threshold 540 can be biased to mitigate determining a result is relevant when the result is non-relevant (e.g., a type II error).

It is to be appreciated that the foregoing is illustrative and not limitative. For example, other distributions such as a Bernoulli, binomial, Pascal, Poisson, arcsine, beta, Cauchy, chi-square (e.g., with N degrees of freedom), Erlang, uniform, exponential, gamma, Gaussian-univariate, Gaussian-bivariate, Laplace, log-normal, rice, Weibull and Rayleigh distributions can be employed in accordance with an aspect of the present invention. In addition, the means of the distributions can be more or less proximate, with various variances, and the relative position of the distributions can be contrary to the description above. Moreover, a filtering technique utilizing either the relevant distribution 520 or the non-relevant distribution 530 can be employed. For example, the threshold 540 can be employed with the relevant distribution 520 to determine whether the result is relevant, instead of whether the result is more likely to be associated with the relevant or non-relevant distribution.

It is noted that various other techniques can be employed in accordance with an aspect of the present invention. For instance, machine learning can be utilized to classify a page as relevant or not relevant and/or to assign a degree of relevance. For example, classification can be based on a plurality features, including word occurrences, distributions, page layout, inlinks, outlinks, and the like.

Figure 6:
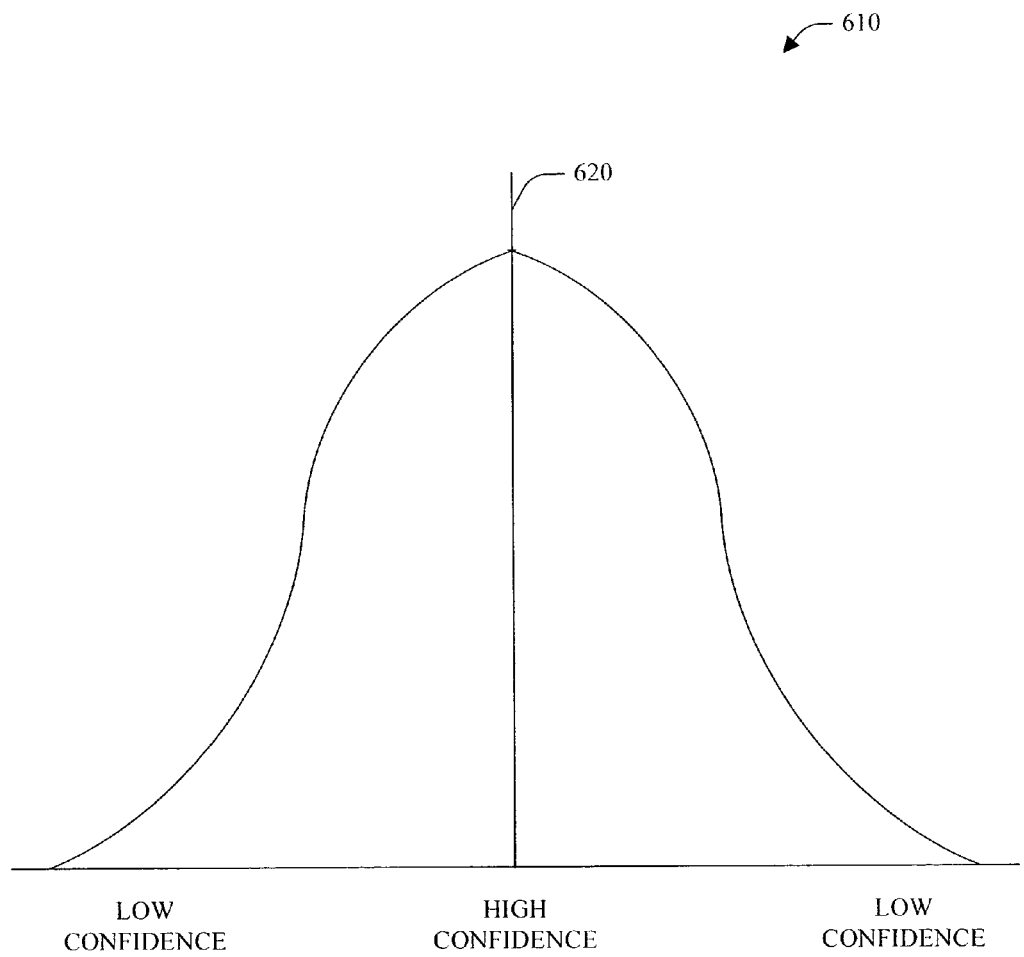
FIG. 6 illustrates an exemplary ranking technique, in accordance with an aspect of the present invention.

FIG. 6 illustrates an exemplary ranking technique, in accordance with an aspect of the present invention. As described in connection with the filter techniques above, word probability distributions can be generated for the relevant and non-relevant sets of documents, and then employed to determine whether a result is relevant via generating a word probability for the result, and comparing the result with a threshold. In addition, the word probabilities can be utilized to rank the search results according to the relevance to the search entry point. For example, a confidence interval 610 can be employed to determine which result is more likely to be relevant to the search query. For example, the result with the greater degree of relevance, or greater confidence can be determined via comparing a mean associated the results with the distribution mean 620 (e.g., $\mu=0$). A result with a greater confidence can be ranked higher for presentation to the user.

In another aspect of the present invention, a similarity measure can be utilized. For example, similarity measures such as a cosine distance, the Jaccard coefficient, an entropy-based measure, a divergence measure, and/or a relative separation measure can be employed to generate a similarity measure for the word probability.

The cosine distance, or similarity can be defined via equations 1-2. Equation 1 depicts the cosine of the angle ($c(T_i,T_j)$) between the sets of queries. Typically, normalization is employed over the intersection of the sets of informative terms.

$$c(T_i, T_j) = \frac{\sum k : t_k \in I(i,j) \omega_{ik} \cdot \omega_{jk}}{\|W_i\| \cdot \|W_j\|}. \qquad \text{Equation 1}$$

Equation 2 depicts the score, or similarity measure for the cosine distance.

$$S(T_i, T_j) = \frac{|I(i,j)|}{|U(i,j)|} \cdot c(T_i, T_j), \qquad \text{Equation 2}$$

where $S(T_i,T_j)$ is the similarity between two sets of queries, $I(i,j)$ is the set of terms common to $T_i$ and $T_j$, $U(i,j)$ is the union of the two sets, and $c(T_i,T_j)$ is the cosine angel.

The Jaccard coefficient equation can measure the degree of overlap between two sets, and is defined in equation 3.

$$S(T_i, T_j) = \frac{|I(i,j)|}{|U(i,j)|}, \qquad \text{Equation 3}$$

where $S(T_i,T_j)$ is the similarity, $I(i,j)$ is the set of terms common to $T_i$ and $T_j$, and $U(i,j)$ is the union of the two sets. A weighted Jaccard coefficient equation measures the weighted overlap between two sets. For the weighted Jaccard coefficient, the denominator is a consequence of the assumed normalization of the two vectors. The weighted Jaccard coefficient is defined in equation 4.

$$S(T_i, T_j) = \frac{\sum k : t_k \in I(i,j)(\omega_{ik} + \omega_{jk})}{2}. \qquad \text{Equation 4}$$

Equation 5 illustrates an exemplary entropy based similarity measure, or a weighted mutual information measure. The weighted mutual information measure is loosely based on the mutual information of distributions on two random variables X and Y, calculated as $I(X,Y)=H(X)+H(Y)-H(XY)$. The weighted mutual information measure is defined as:

$$S(T_i, T_j) = \frac{|I(i,j)|}{|U(i,j)|} \cdot (H(i) + H(j) - H(ij)), \qquad \text{Equation 5}$$

where $S(T_i,T_j)$ is the similarity, $I(i,j)$ is the set of terms common to $T_i$ and $T_j$, $U(i,j)$ is the union of the two sets, $H(i)$ is the entropy of a set of queries i, $H(j)$ is the entropy of a set of queries j, and $H(ij)$ is the entropy of the combined set of queries i and j.

FIGS. 7-10 illustrate methodologies in accordance with the present invention. For simplicity of explanation, the methodologies are depicted and described as a series of acts. It is to be understood and appreciated that the present invention is not limited by the acts illustrated and/or by the order of acts, for example acts can occur in various orders and/or concurrently, and with other acts not presented and described herein. Furthermore, not all illustrated acts may be required to implement a methodology in accordance with the present invention. In addition, those skilled in the art will understand and appreciate that a methodology could alternatively be represented as a series of interrelated states (e.g., state diagram) or events.

Figure 7:
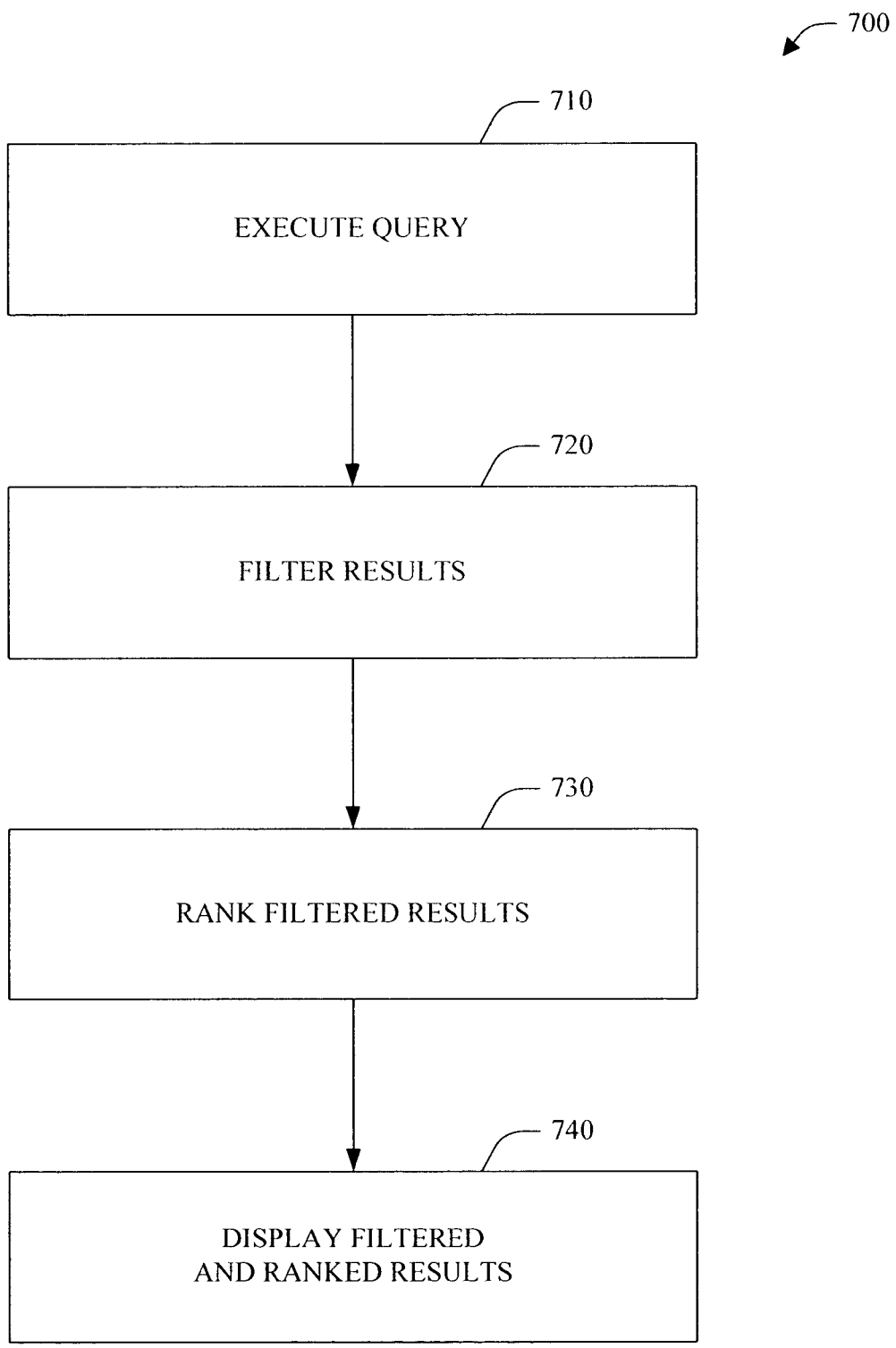
FIG. 7 illustrates a methodology to filter and rank results from a general-purpose search engine, in accordance with an aspect of the present invention.

FIG. 7 illustrates a methodology to filter and rank results from a general-purpose search engine, in accordance with an aspect of the present invention. Proceeding to reference numeral 710, a user executes a search query through an entry point. For example, the user can launch a web browser and access the general-purpose search engine from any web page with a link to the general purpose search engine. In addition, the user can launch the web browser from within an application, for example, by selecting a link to on-line information associated with the application. Then, the user can provide search terms to the general-purpose search engine and deploy the general-purpose search engine.

The query results can be filtered at 720. For example, filtering criteria associated with the entry point can be applied to the query results. For example, probability based criteria such as probability distributions for search context relevant data and unrelated data can be generated for respective entry points. In addition, a word probability can be generated for the received result. The word probability can be compared with the distributions to determine whether the result is relevant or non-relevant. Relevant results can be conveyed for ranking, and non-relevant results can be discarded or ranked lower. At reference numeral 730, the results can be ranked. For example, the word probability can be employed to determine the degree of relevance, wherein the greater the degree, the more relevant the result. At 740, the relevant results can be presented to the user according the degree of relevance.

It is to be appreciated that the foregoing example is explanatory, and not limitative. For example, various other techniques to can be employed to apply the filter criteria of an entry point to a received result to determine whether the result is relevant.

Figure 8:
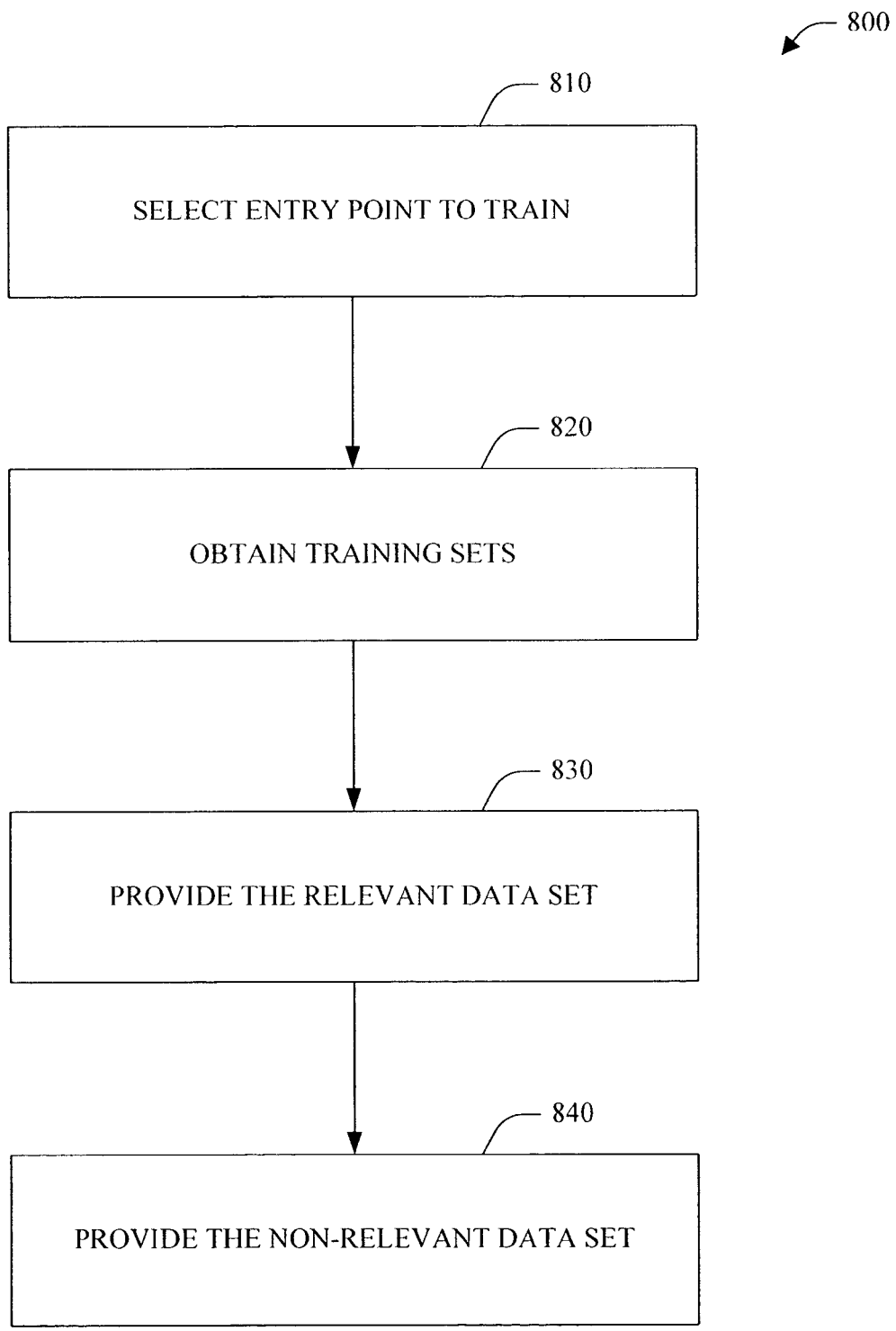
FIG. 8 illustrates a methodology to manually train a filter associated with a general-purpose search engine, in accordance with an aspect of the present invention.

FIG. 8 illustrates a methodology to manually train a filter associated with a general-purpose search engine, in accordance with an aspect of the present invention. At 810, an entry point for a group can be selected in order to configure a filter for the entry point and the search context of a group. At reference numeral 820, a set of data relevant to the group search context and a set of data non-relevant to the search context can be obtained. For example, the entry point can be associated with an application, wherein searches deployed via the application typically are associated with the application's context. For example, the search can be associated with on-line information for the application. Under such circumstances, the set of relevant can be can include the web pages associated with the help pages of the application. The set of non-relevant data can be, for example, random data unrelated to the search context for the entry point.

Next at reference numeral 830, the relevant data can be provided to the filter. The relevant data can be employed as a training set to train the filter to learn document features that render a document relevant. At 840, the non-relevant data can be provided to the filter and employed as training sets to train the filter to learn document features that render a document non-relevant. The relevant and non-relevant training data can be employed when a query result from the general-purpose search engine is returned. The query result can be compared to the relevant and non-relevant data sets to determine whether the result is associated with the relevant data or with the non-relevant data.

Figure 9:
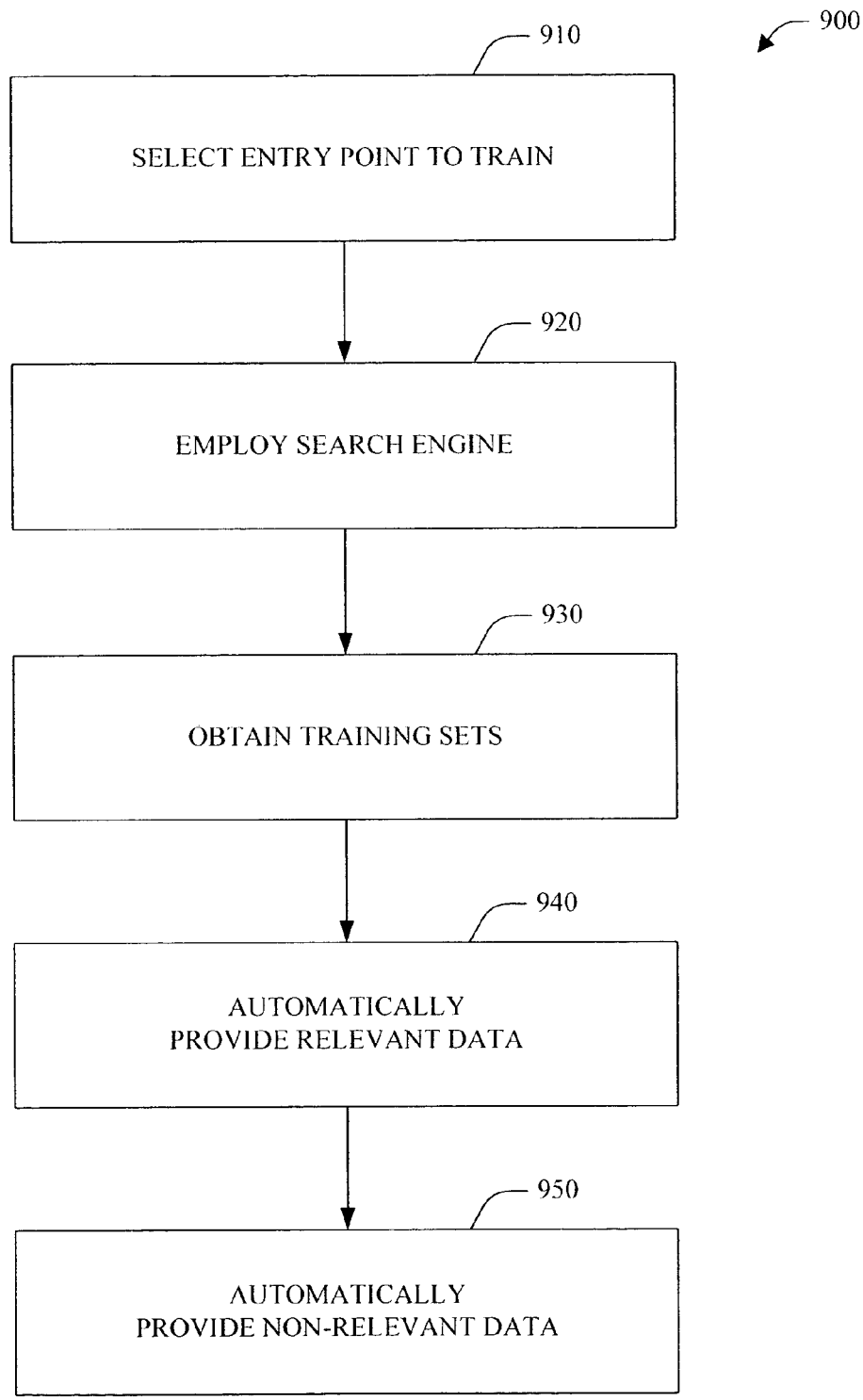
FIG. 9 illustrates a methodology to automatically train a filter associated with a general-purpose search engine, in accordance with an aspect of the present invention.

FIG. 9 illustrates a methodology to automatically train a filter associated with a general-purpose search engine, in accordance with an aspect of the present invention. At 910, an entry point can be selected in order to configure a filter for a group associated with the entry point. At 920, a user can execute a query through an entry point, as described herein. The results of the search query can then be provided to the user. At 930, relevant and non-relevant data sets can be obtained. For example, the user can select results by clicking on relevant links, wherein the selected results are saved as relevant data. Additionally, higher ranked results passed over for lower-ranked result can be saved as non-relevant data.

Next at 940, the saved relevant results can be employed to train the filter to discern relevant data. At 950, the saved non-relevant results can be employed to train the filter to discern non-relevant data. The relevant and non-relevant results can be employed to train the filter to learn the features that differentiate relevant data from non-relevant data. In one aspect of the present invention, the saved results can be automatically provided (e.g., serially and/or concurrently). In another aspect of the present invention, the saved results can be manually provided.

Figure 10:
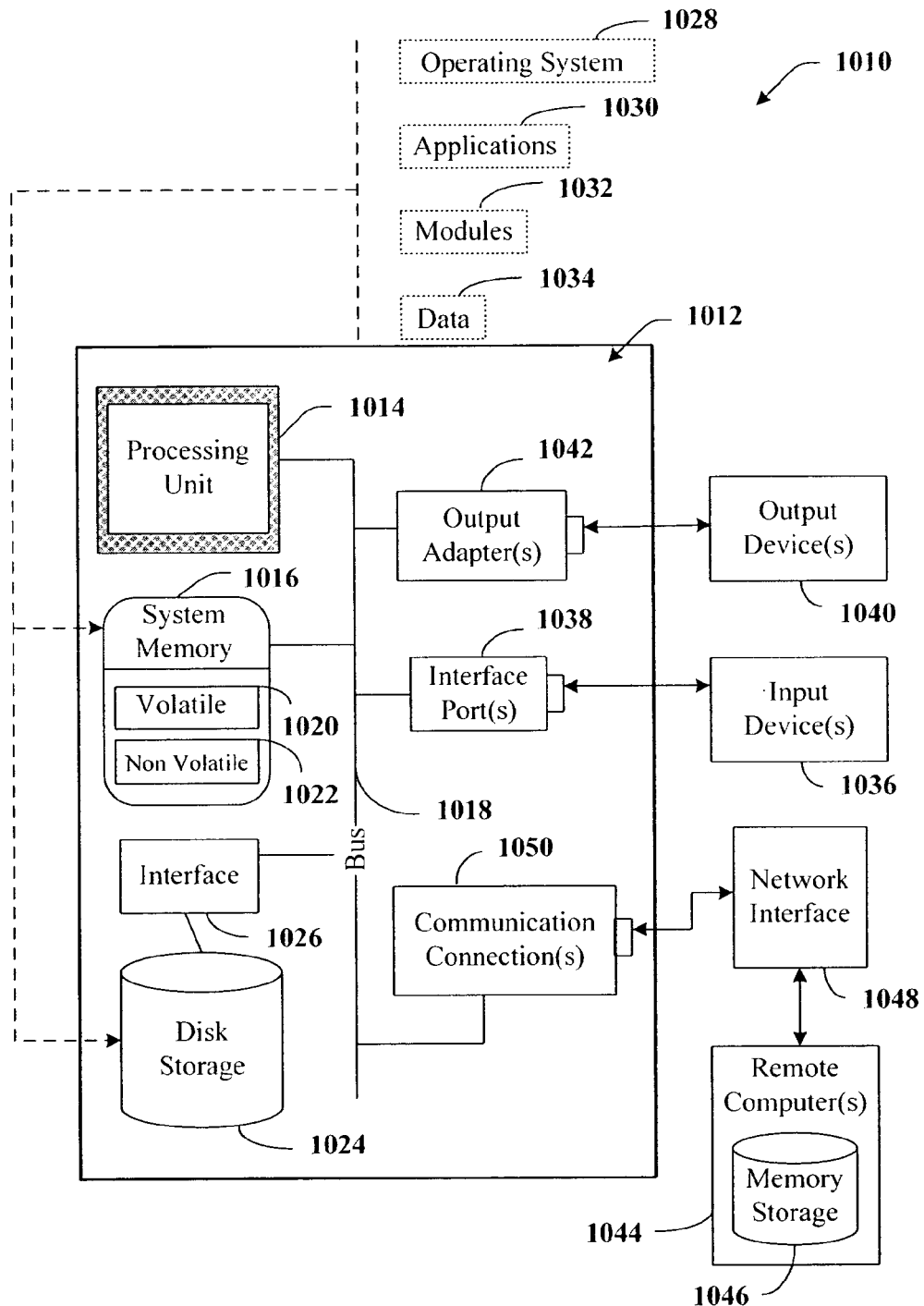
FIG. 10 illustrates an exemplary operating system, in accordance with an aspect of the present invention.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, an 10-bit bus, Industrial Standard Architecture ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1002.3, Token Ring/IEEE 1002.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the term "includes" and variants thereof are used in the detailed description or the claims, these terms are intended to be inclusive in a manner similar to the term "comprising."

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

What is claimed is:

1. A system that refines a general-purpose search engine, comprising: a memory; a processor;
  a component, stored in the memory and executed by the processor, that identifies an entry point that includes a link utilized to access the general-purpose search engine; and
  a tuning component, stored in the memory and executed by the processor, that receives search query results of the general-purpose search engine and filters the search results based at least on criteria associated with the entry point through which the general-purpose search engine was accessed, the criteria comprises at least a first set of data categorized as relevant to a user's context and a second set of data categorized as non-relevant to the user's context, wherein user selection of a query result from a ranked list of the query results causes the selected result to be added to the first set of data and causes the results not selected by the user but ranked higher than the selected result to be automatically added to the second set of data, the first and second sets of data persisted to a computer-readable storage medium.

2. The system of claim 1, the criteria comprising one or more of a document property, a context parameter, or a configuration.

3. The system of claim 2, the document property comprising one or more of a term that appears on a web page, a property of a Uniform Resource Locator (URL) identifying the web page, a property of a plurality of URLs that link to the web page, a property of a plurality of web pages that link to the web page, or a layout.

4. The system of claim 2, the context parameter comprising one of a word probability or a probability distribution.

5. The system of claim 1, the tuning component is provided with training data to learn what properties of a document are indicative of the document being relevant to a user executing a search query from the entry point.

6. The system of claim 1, the tuning component configured to differentiate between a query result that is relevant to a search query context for a group of users and a query result that is non-relevant to the search query context for the group of users.

7. The system of claim 1, the tuning component employs statistical analysis in connection with filtering the search query results.

8. The system of claim 1, the tuning component generates one or more context parameters for a received query result, and compares the generated context parameters with a relevant context parameter and a non-relevant context parameter to determine whether the query result is relevant.

9. The system of claim 1, the tuning component further ranks the query results.

10. The system of claim 9, the ranking determined by the degree of relevance of the query result to the relevant data set and the non-relevant data set, the relevance is determined via one of a similarity measure or a confidence interval.

11. The system of claim 9, the ranking order comprising one of ascending or descending, from the most relevant result to the least relevant result.

12. The system of claim 1, the tuning component configured for a plurality of entry points associated with one or more groups of users.

13. A system that tunes a general-purpose search engine, comprising: a memory; a processor;
a filter component, stored in the memory and executed by the processor, that receives search query results of a general-purpose search engine and parses relevant and non-relevant results based on training data associated with the entry point that provides a link employed to traverse to the general-purpose search engine, the training data comprises a first set of data categorized as relevant to a search context of a user for the entry point and a second set of data categorized as non-relevant to the search context of the user; and
a ranking component, stored in the memory and executed by the processor; that sorts the filtered results in accordance with the training data for presentation to a user, wherein a user clicking a link associated with a search result from the sorted results causes the result to be added to the first set of data and causes the results whose links were not clicked by the user but that are ranked higher than the clicked result to be automatically added to the second set of data, the first and second sets of data persisted to a computer-readable storage medium.

14. The system of claim 13, the filter component parses the results as a function of one or more of a document property, a context parameter, or a configuration associated with the entry point.

15. The system of claim 13, the filter component trained to differentiate between a relevant and a non-relevant result via the training data.

16. The system of claim 13, the second set of data categorized as non-relevant comprising random data unrelated to the search context of the user for the entry point.

17. The system of claim 13, the filter component employs statistical analysis to determine whether a result is relevant or non-relevant to the entry point.

18. The system of claim 13, the ranking component employs a technique to determine the degree of relevance of the query results with respect to the relevant data set and the non-relevant data set.

19. The system of claim 18, the technique comprising one of a similarity measure or a confidence interval.

20. The system of claim 18, the ranking performed on the relevant query results, the non-relevant results are discarded.

21. The system of claim 13, the ranking order comprising one of ascending and descending, from the most relevant result to the least relevant result.

22. A computer-implemented method to filter and rank general-purpose search engine results based on criteria associated with an entry point, comprising:
executing a query search with the general-purpose search engine accessed through a link associated with the entry point;
filtering the general-purpose search engine results by tuning the general-purpose search engine based on a set of training data associated with the entry point employed to access the general purpose search engine;
ranking the filtered general-purpose search engine results;
automatically storing a first query result selected by a user in a first data set categorized as relevant;
automatically storing at least one non-selected query result that is ranked higher than the first query result in a second data set categorized as non-relevant upon selection of the first query result; and
including the first data set and second data set in the set of training data associated with the entry point employed to access the general purpose search engine.

23. The method of claim 22, further comprising employing a statistical hypothesis to determine whether a result is relevant or non-relevant to a search context of the entry point.

24. The method of claim 23, the statistical hypothesis employing a threshold in connection with a probability distribution for relevant data and a probability distribution for non-relevant data, respective word probabilities are generated for the search query results and compared to the threshold, the probability distribution for relevant data and the probability distribution for non-relevant data to determine whether the results are relevant or non-relevant.

25. The method of claim 24, the threshold employed to bias the decision to mitigate one of a result being deemed non-relevant when the result is relevant or a result being deemed relevant when the result is non-relevant.

26. The method of claim 22, further employing a probability distribution analysis or machine learning in connection with the filtering and ranking, wherein suitable probability distributions include a Bernoulli, a binomial, a Pascal, a Poisson, an arcsine, a beta, a Cauchy, a chi-square with N degrees of freedom, an Erlang, a uniform, an exponential, a gamma, a Gaussian-univariate, a Gaussian-bivariate, a Laplace, a log-normal, a rice, a Weibull and a Rayleigh distribution, and the machine learning can classify based on one or more of a word occurrence, a distribution, a page layout, an inlink, and an outlink.

27. The method of claim 22, further comprising employing a statistical analysis to rank search query results.

28. The method of claim 27, the ranking comprising one of generating word probabilities and employing a confidence interval to determine relevance, and generating a similarity measure comprising one of a cosine distance, the Jaccard coefficient, an entropy-based measure, a divergence measure and/or a relative separation measure to determine similarity.

29. A computer-implemented method to customize a general-purpose search engine to improve context search query results, comprising:
 tuning a general-purpose search engine for an entry point by employing a method further comprising:
  providing a first set of data categorized as relevant that is used by a component to discern query results relevant to a search context of a user employing the entry point, the entry point provides a link employed to access the general-purpose search engine;
  providing a second set of data categorized as non-relevant that is used by the component to discern query results unrelated to the search context, the first set of data and the second set of data are manually provided;
  determining whether a query result is relevant or non-relevant to the search context based on the first set of relevant data and the second set of non-relevant data, each query result is compared with both the first set of data and second set of data to determine the relevance of the query result;
  executing a search query with the general purpose search engine to obtain a ranked list of query results;
  selecting a link associated with a query result from the list;
  automatically adding the selected query result to the first set of data; and
  automatically adding non-selected results from the list that are ranked higher than the selected query result to the second set of data upon selection of the selected query result.

30. The method of claim 29, the first set of data categorized as relevant comprising data associated with the search context of the user for the entry point.

31. The method of claim 29, the second set data categorized as non-relevant comprising random data unrelated to the search context of the user for the entry point.

32. The method of claim 29, further comprising providing information to associate respective query results with the entry point.

33. The method of claim 29, the first set of data categorized as relevant and the second set of data categorized as non-relevant employed to train the component to learn features that differentiate relevant data from non-relevant data.

34. A computer-implemented method to automatically customize a general-purpose search engine for an entry point, comprising:
 identifying the entry point;
  executing a query search via the entry point that includes a link employed to route to the general-purpose search engine;
  recording a first query result from a ranked list of query results returned from the executed query as relevant when a user views the document associated with the first query result;
  recording at least one second query result whose associated document was not viewed by the user but that is ranked higher than the first query result as non-relevant when the first result is selected for viewing by the user; and
  providing the recorded results to automatically train the filter for the entry point, in order to discriminate between results relevant to a search context of the user for the entry point and results non-relevant to the search context.

35. The method of claim 34, the set of relevant data comprising data associated with the search context of the user for the entry point.

36. The method of claim 34, the set of non-relevant data comprising data unrelated to the search context of the user for the entry point.

37. The method of claim 34, further comprising providing information to associate respective query results with the entry point.

38. The method of claim 34, the set of relevant data and the set of non-relevant data employed to train the component to learn the features that differentiate relevant data from non-relevant data.

39. The method of claim 34, the query results selected via a click thru technique employing a mouse to select a link associated with the query result by clicking on the link.

40. The method of claim 34, further comprising generating a word probability distribution for the relevant recorded results and a word probability distribution for the non-relevant recorded results.

41. A computer readable storage device storing computer executable components that tunes a general-purpose search engine to improve context search query results, comprising:
 a component that, when executed by a processor, receives search query results of a general-purpose search engine and filters the results based on training data sets associated with the search context of a user depending on the entry point that provides a link utilized to arrive at the general-purpose search engine, the training data sets include at least a first category of data explicitly defined to be relevant to the search context and a second category of data explicitly defined to be non-relevant to the search context; and
 a component that, when executed by a processor, ranks the filtered general-purpose search engine results according to the similarity of the search engine results to the training data sets, wherein selecting a link associated with a first search result from the ranked results causes the first result to be added to the first set of data and causes results that are ranked higher than the first result and have not been selected by the user to be automatically added to the second set of data.

42. A system that receives, filters and ranks general-purpose search engine results, comprising: a memory; a processor;
 a component, stored in the memory and executed by the processor, for filtering general-purpose search engine results by determining whether a query result is relevant to a search context of a group of users, the search context is associated with an entry point that includes a link employed to navigate to the general-purpose search engine, the search context further having an associated first set of training data categorized as relevant to the context and an associated second set of training data categorized as non-relevant to the context; and
 a component, stored in the memory and executed by the processor, for ranking the filtered general-purpose search engine results based on a relevance of the general-purpose search engine results to the search context of the group of users and the entry point as determined by a comparison of the search engine results with the first and second sets of training data, wherein a user viewing a document associated with a first search result from the ranked results causes the first result to be added to the first set of training data and causes the results that are unviewed but ranked higher than the first result to be automatically added to the second set of training data, the first and second sets of training data stored on a computer-readable storage medium.

* * * * *